F. J. WILLIS.
MECHANICAL POWER TRANSMITTING DEVICE.
APPLICATION FILED JULY 3, 1915.
1,211,023.
Patented Jan. 2, 1917.
2 SHEETS—SHEET 1.
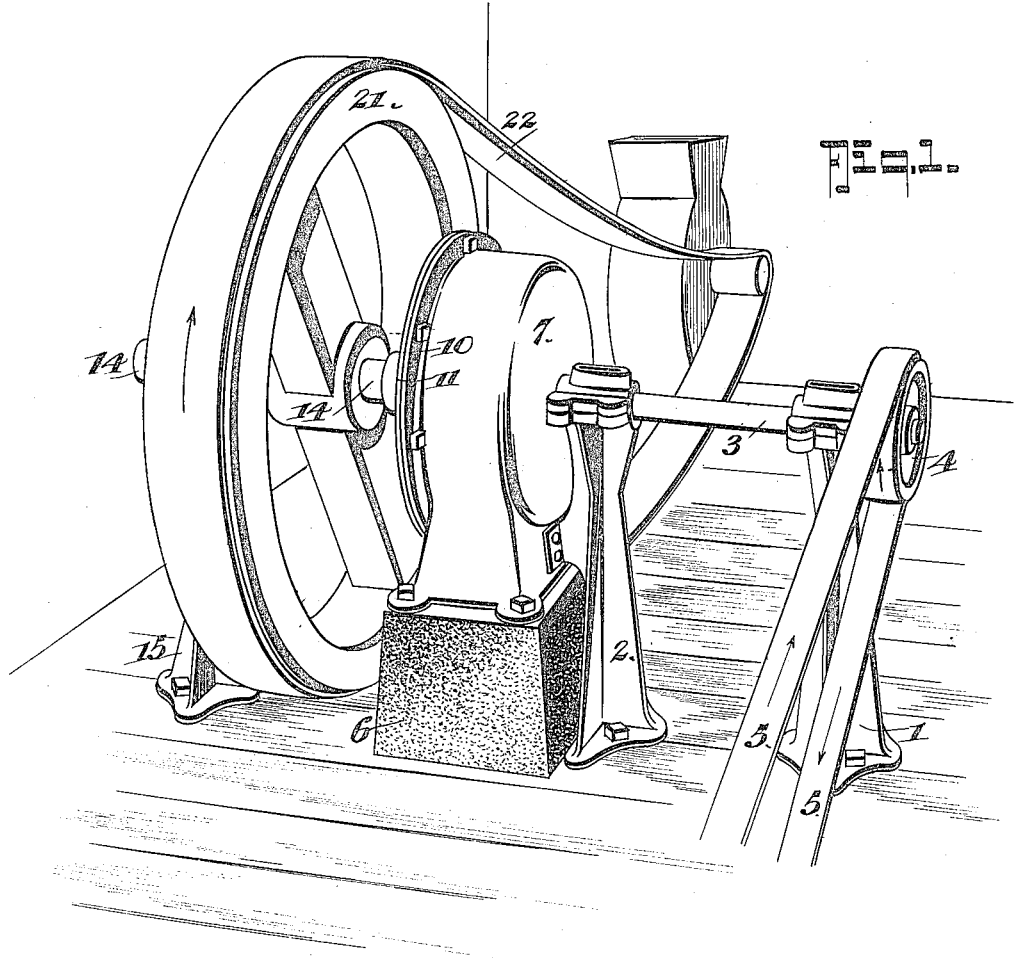
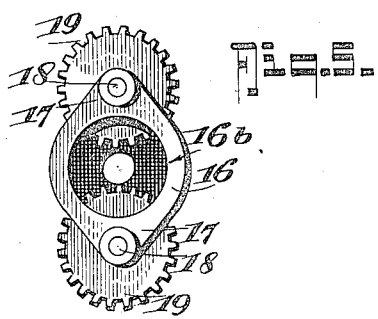
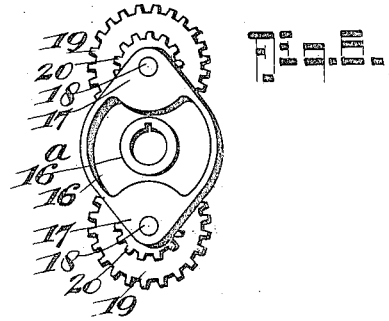
WITNESSES:
INVENTOR
Floyd J. Willis.
BY
ATTORNEYS

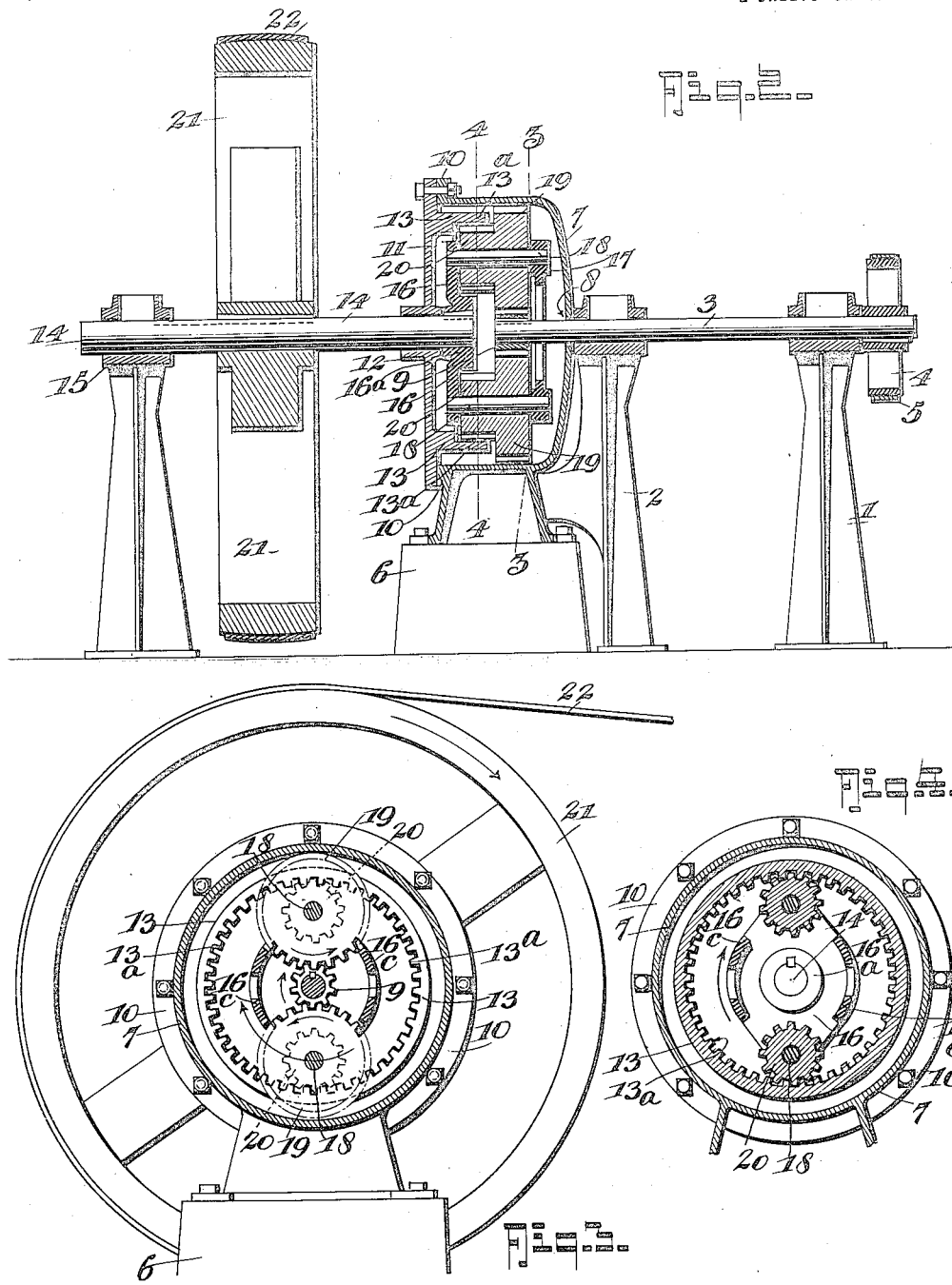

UNITED STATES PATENT OFFICE.

FLOYD J. WILLIS, OF NOTASULGA, ALABAMA.

MECHANICAL POWER-TRANSMITTING DEVICE.

1,211,023. Specification of Letters Patent. Patented Jan. 2, 1917.

Application filed July 3, 1915. Serial No. 37,887.

*To all whom it may concern:*

Be it known that I, FLOYD J. WILLIS, a citizen of the United States, and a resident of Notasulga, county of Macon, and State of Alabama, have invented a new and useful Improvement in Mechanical Power-Transmitting Devices, of which the following is a specification.

The principal object of my invention is to provide a mechanical device to which power may be applied at a certain speed and converted into power of greater magnitude at a slower speed.

Another object is to provide a power transmitting device which may be used under circumstances where the available machinery is of too great a speed to be utilized for such purposes as operating rock and coal crushers, and in such instances the available power at excessive speed can be changed to greater power at a suitably low speed for the operation of such devices as named, by the applying of my invention.

Another object is to attain the ends set forth with a simple mechanism which because of its simplicity can be easily and cheaply manufactured as well as maintained.

With other objects in view which shall hereinafter be made clear in the following specification and especially pointed out in the appended claims, reference is now directed to the accompanying drawing in which:—

Figure 1 is a perspective view of my device illustrating it as used to operate a crushing machine, Fig. 2 is a central longitudinal section thereof, Fig. 3 is a cross section on line 3—3 on Fig. 2, Fig. 4 is a similar view on line 4—4 on Fig. 2, and Figs. 5 and 6 are obverse and reverse face views of the compound gear carrying frame.

Mounted in bearing standards 1 and 2 is a drive shaft 3 on which is fixedly mounted a driving pulley 4 to which power is applied by any suitable means such as an electric motor through the medium of the belt 5.

Located on a concrete base 6 and rigidly bolted thereto, is a gear housing 7 which has a circular opening 8 adjacent the shaft 3 through which opening 8 the shaft 3 projects into the housing and carries a pinion 9 which is secured to the shaft as shown in Fig. 2. The housing 7 is open at the rear and has an annular flange 10 which is apertured for clamping bolts which pass through similar apertures in a rear cover plate 11 which serves to keep out dust and other extraneous matter from the interior of the casing, and may as well be easily removed for inspection of the interior mechanism.

The cover plate 11 has a centrally apertured bearing hub 12 which supports the end of the driven shaft 14 which projects into the casing 7 through the opening in the hub 12 and is also supported in a bearing standard 15 as shown. The cover plate has also an internal annular gear track $13^a$ formed in an annular and inwardly projecting flange 13.

Keyed onto the end of the shaft 14 and within the housing 7, is a gear carrying frame 16 which has two pairs of bearings 17 which support a cross shaft 18 extended from one bearing at one side to the similar bearing on the other side, the ends of the said shaft being fixedly held in the bearings 17. Rotatably mounted on each of the cross shafts 18 is a compound gear which consists of one 19, of a large diameter, and an integrally formed one 20, of lesser diameter, the gear 19 being adapted to mesh with the pinion 9 on the drive shaft 3 and the gears 20 mesh with the integral gear track $13^a$, when the machine is assembled as in Fig. 2.

The gear carrying frame 16 is formed with an enlarged hub $16^a$ where it is mounted on the drive shaft 14 and the end of the shaft as well as the opening in the hub are slotted for the reception of a key by means of which the shaft is fixedly connected with the frame. The frame 16 is also provided with an opening $16^b$ at the other side through which the shaft 3 projects without interference. The front and back portions of the frame 16 are integrally connected as to make a unitary structure, by webs $16^c$ at each side as shown in Figs. 3 and 4.

The driver or power off-take pulley is indicated at 21 and is fixedly keyed to the shaft 14 so as to be moved thereby, a suitable belt 22 encircling the pulley, serves to operate any other machine requiring power greater than that applied at the pulley 4, but at a lesser speed.

Operation: When power at a certain speed is applied to the shaft 3, the pinion 9 fixed on the end of the shaft internally of the housing 7, revolves and being in mesh with the larger one 19 of the compound gears, causes them to turn on their axes 18. The pinion 9 is of approximately one-third the pitch-diameter of the large gear 19 and will consequently rotate 19 at one-third of its speed.

Since the one 20, of lesser diameter, of the compound gears, meshes with the internal gear track 13$^a$, when the compound gears revolve they must of necessity travel around the said gear track 13$^a$ since it is stationary and in doing this the frame 16 is also carried with the aforesaid gears, and the drive shaft 14 with which the frame is connected will rotate. The gears 20 being of lesser diameter, than the gears 19 and meshing with the internal gear 13$^a$ of greater pitch diameter, the rotational speed of the shaft 14 will be considerably reduced under that of the shaft 3 and consequently the available power if multiplied to a considerable extent making it usable for devices requiring great power for operation but at a comparatively low speed.

Obviously variations and modifications can be made in the specific embodiment of my invention, without departing from the spirit thereof as set forth in the accompanying claims.

I claim:

1. In a power transmitting mechanism, a stationary housing having a circular opening at one end and a flanged opening at the other end, a cover plate for the last named opening having a centrally apertured bearing hub and an inwardly projected flange adjacent its outer edge extending within the housing, a gear track formed internally of said flange, a drive shaft extending into the housing and having a pinion, a driven shaft projecting into the housing through said bearing hub and carrying a frame, and compound gears of two diameters mounted in the frame, the ones of lesser diameter meshing with the internal gear track and the others meshing with said drive shaft pinion.

2. In a power transmitting mechanism, a housing having a circular opening at one end and a flanged opening at the other end, a cover plate for the last named opening having a centrally apertured bearing hub and an inwardly projected flange extending within the flanged edge of the housing, a gear track formed internally of said flange, a two-part line shaft comprising a drive shaft and a driven shaft projecting in axially alined relation into the housing through the circular opening therein and through the apertured bearing hub, respectively, with their ends spaced apart, a pinion secured to the drive shaft internally of the housing, a gear carrying frame secured to the driven shaft internally of said housing and around said shaft ends, and compound gears of two diameters mounted in the frame, the ones of lesser diameter meshing with the internal gear track and the ones of greater diameter meshing with the drive shaft pinion.

FLOYD J. WILLIS.